United States Patent [19]

Koehler

[11] 4,297,010
[45] Oct. 27, 1981

[54] SLIDE TRAY PROTECTOR

[76] Inventor: Robert P. Koehler, 653 O'Dell St., Madison, Wis. 53711

[21] Appl. No.: 108,780

[22] Filed: Dec. 31, 1979

[51] Int. Cl.³ .................. G03B 23/06; G03B 21/14
[52] U.S. Cl. ........................... 353/122; 206/316; 353/103
[58] Field of Search ............ 353/119, 122, 103, 111; 206/316, 455

[56] References Cited

U.S. PATENT DOCUMENTS

| | | | |
|---|---|---|---|
| 3,349,510 | 10/1967 | Kluge | 353/103 |
| 3,552,846 | 1/1971 | Hansen | 353/103 |
| 3,781,103 | 12/1973 | DiPietro | 353/111 |
| 4,170,409 | 10/1979 | Sobotta et al. | 353/119 |

*Primary Examiner*—Steven L. Stephan
*Attorney, Agent, or Firm*—Wheeler, House, Fuller & Hohenfeldt

[57] ABSTRACT

A protective cover for a photographic slide tray that is used with a slide projector. The cover is a thin disk of semi-rigid material having a large central opening and a generally imperforate annular marginal area which is superposed over circularly arranged separator walls which define slide holding slots in the tray. A flanged locking ring which holds the slides in the tray also secures the cover. The cover yields under the influence of the air blast from the projector cooling fan to minimize retardation of cooling air flow.

6 Claims, 3 Drawing Figures

SLIDE TRAY PROTECTOR

The invention is a cover for protecting film transparencies or photographic slides against accumulating dust while the slides are in a slide tray that is used with a slide projector.

Typical commercially available slide trays comprise a circular plate that interfaces with the slide projector and has a slot in its bottom through which slides drop successively into the magazine of the projector for being projected. Mounted on the plate is an upstanding circular channel in which a plurality of radially and axially extending spaced apart separators or partition walls are arranged to provide slots for the individual slides. The tops of the slots are open to enable inserting and withdrawing slides from the tray. A locking ring is adaptable for engagement with the tray and it has a flange which overhangs the slots and the slides therein to prevent the slides from falling out of the tray after it is loaded.

As a result of the flange on the locking member having a lesser radial extent than the slots, most of the radial length of the slots is open. This provides an opportunity for dust which is entrained in the ambient air to settle into the slots and deposit on the slides. The grains of dust are magnified when the slide transparency is projected and, if there is enough dust deposited, the projected image has a hazy defocused appearance when it is observed on a screen. One commonly used method of removing the dust is to brush both sides of the film transparency of the slide. Another method is to direct a jet of air againt both surfaces of the slide to scatter the dust into the atmosphere. Aerosol cans containing pressurized gas and equipped with a suitable nozzle are commercially available for this purpose. Anyone involved in projecting slides regularly knows that both of these methods are time consuming and monotonous. Lecturers, for example, who use slides to illustrate the subject matter of their lecture are likely to be obliged to clean their slides most frequently because their slide trays are out in the air so much of the time. However, even when the slides are used as infrequently as one might use them in the home the slides accumulate dust rather rapidly.

SUMMARY OF THE INVENTION

In accordance with the invention, a thin cover disk is provided for being superimposed over the top of the slots in a slide tray and for being secured in place on the tray with the same ring member that interlocks with the slide tray body and overhangs the slides to prevent them from falling out of the tray. The cover disk may be made of paper but is preferably made of synthetic resin film which is either light enough or pliant enough or both to flex and yield a little under the influence of the hot air stream which emits from the projector so that cooling air flow is not significantly impeded. The cover provides an opportunity for the user to apply identifying or descriptive information on its surface, such as by attaching self-adhesive labels, or advertising information or the like can be printed on the cover.

A more detailed description of a preferred embodiment of the new slide tray cover will now be set forth in reference to the drawing.

DESCRIPTION OF A PREFERRED EMBODIMENT

Figure 1:
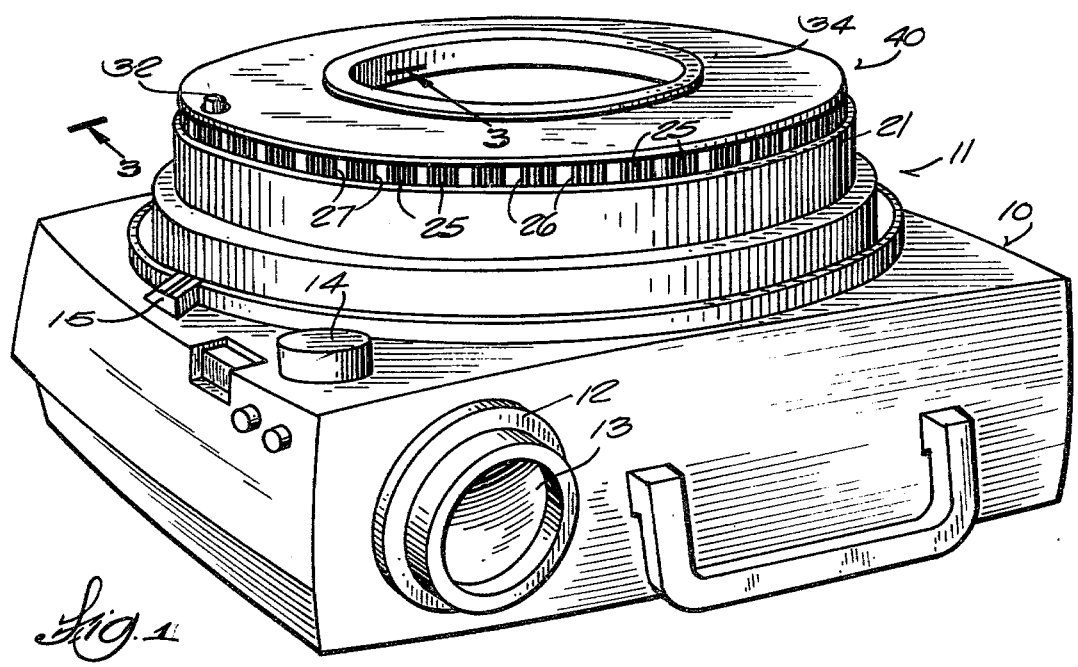
FIG. 1 is a perspective view of a slide projector with a loaded slide tray attached to it and with the new cover installed on the tray.

FIG. 1 depicts a typical slide projector which is generally designated by the reference numeral 10. By way of example and not limitation, the illustrated projector and the slide tray 11 which is mounted on it is comparable to the projector which is sold by Eastman Kodak Company and is known as "Kodak Carousel" projector. It will be understood, however, that the new dust projecting cover for the slide tray is applicable to a wide variety of commercial available slide trays having the general characteristics of the illustrated tray.

In FIG. 1, projector 10 comprises a housing, usually molded from synthetic resin, and having a cylindrical holder 12 in its front for a projection lens 13 that can be advanced and retracted for focusing by turning a knob such as the one marked 14. As is well-known but not shown, within slide projector 10 there is a magazine for holding a slide that is to be projected between an incandescent lamp and projection lens 13. The lamp heats the air within the projector housing so there is a motor-driven fan, not shown, within the housing for drawing air through a grille from the outside and expelling it through whatever openings are available in the housing and in the slide tray 11 for the hot air to escape.

The slide projector illustrated in FIG. 1 has electrically operated means, not shown, for advancing slide tray 11 rotationally in a step-by-step fashion to allow individual slides to be dropped into the magazine for projection and to be withdrawn therefrom to make room for the next slide. The outside edge of a typical slide is marked 25 in FIG. 1 and the separator walls which define the slot which the slide is in are marked 26 and 27. Slides drop down into the magazine in the vicinity of a slot 15 which is partially exposed adjacent the circular slide tray 11.

Figure 3:
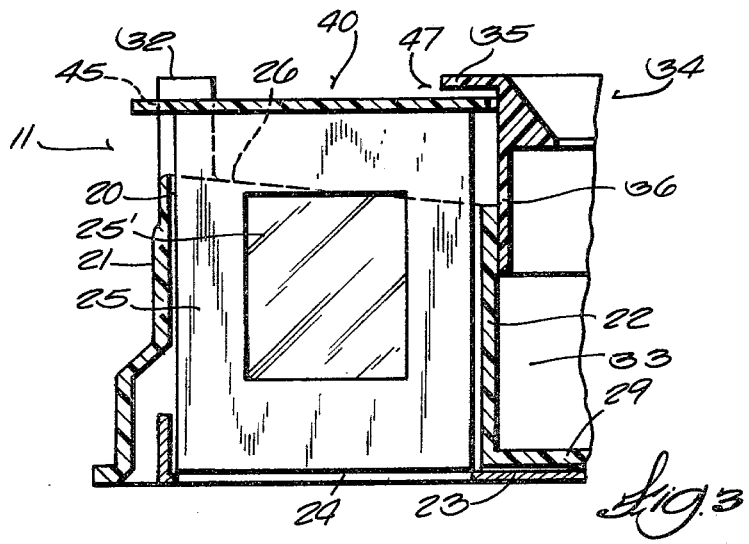
FIG. 3 is a partial vertical section of a slide tray, with slides installed, taken along a line corresponding with 3—3 in FIG. 1.

As can be seen in FIGS. 1 and 3, the slide tray is basically a circular channel 20 defined by a peripheral outside wall 21 and an inside wall 22 which is concentric with the outside wall. The channel is closed at its bottom with a thin metal disk 23 in which there is a slot 24. One slide 25 is shown in FIG. 3. It contains a transparency 25'. In operation, the slide tray channel rotates relative to metal disk 23 and the slides are dropped successively into the projector magazine and withdrawn through slot 24 by a mechanism in the projector which is not shown. As can be seen in FIGS. 1 and 3, partition walls or separators, such as those marked 26 and 27 in FIG. 1 and the one marked 26 in FIG. 3, are disposed around the channel in spaced relationship to define slots between them in which slides may be inserted and held until the projector induces them into the magazine for projection. As shown in FIG. 3, at least one of the separators has an integral upwardly extending projection 32 molded on it. The projection identifies the position of slide no. 1 ordinarily.

The slide tray, as can be seen in FIG. 3, has a large central recess 33 which is defined by the radially inside surface of annular wall 22 and tray bottom 29. A locking ring 34 having a radially outwardly extending flange 35 fits into recess 33. Flange 35 overhangs the slides 28 in the various slots of the tray for the purpose of retaining the slides in the slots. Locking ring 34 has a cylindrical wall 36 which fits closely in circular recess 33. In most commercial tray designs, cylindrical wall 36 has an external male thread segment which engages under a protuberance inside of channel defining wall 22 when the locking ring is rotated to engage and lock the ring to the tray. The ring, as is well-known, must be removed to eliminate interference by flange 35 for loading and unloading slides.

Figure 2:
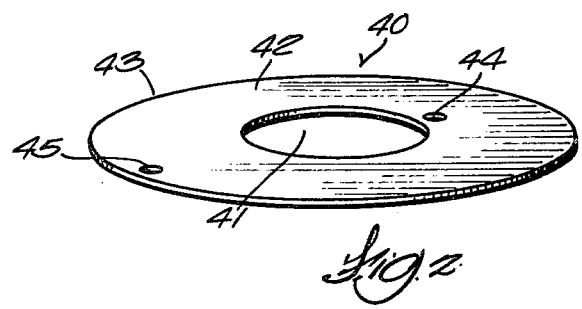
FIG. 2 is a perspective plan view of the new cover.

One of the commercially available slide trays has been briefly described thus far. The construction and functions of the new dust cover will now be described. FIG. 2 shows the new dust cover by itself. It comprises a thin disk which is generally designated by the reference numeral 40. The disk has a central hole 41 which is just slightly larger in inside diameter than the outside diameter of cylindrical wall 36 of locking ring 34 so the cylindrical wall will fit concentrically through hole 41. The marginal area 42 of the disk extending from the periphery of hole 41 to the outside edge 43 is planar. As illustrated, marginal area 42 has two perforations 44 and 45. Perforation 45, as can be seen in FIG. 3, fits over projection 32 to keep the dust cover disk 40 fixed against rotation when it is installed on the slide tray 11 as is the case in FIGS. 1 and 3. Perforation 44 is at a different radial distance from the center of the disk in FIG. 2 than perforation 45 which is for making the dust cover disk adaptable to another model of a slide tray which has a projection that is not spaced as far radially outwardly from the center of the tray as is projection 32. It will be understood that additional perforations may be made in the dust cover 40 or different models may be used to make one of them registrable with a projection on a particular slide tray type.

Note in FIG. 3 that the thickness of the dust cover is such that a small gap 47 is allowed to remain under the locking ring flange 35 so the dust cover is somewhat free to float under the influence of the air stream which is impelled through the magazine entrance slot 15 when the fan within projector housing 10 is running.

Cover disk 40 may be made of a variety of different sheet or film materials such as paper products or synthetic resins. The disk should preferably be stiff enough so that if it is held at its outer edge between the fingers it will not bend down much more than 45° which implies that it should have a thickness and physical properties that assure it will not crack or crumble when it is held at its edge or otherwise handled incidental to use.

Generally, if the disk is made of a paper product such as bristol board or a synthetic resin of medium hardness, it should have a thickness no less than about 0.008 of an inch and no greater than about 0.0625 of an inch. A preferred material for making disk 40 is polycarbonate resin film such as that which is known under the trademark "Lexan" of the General Electric Company. The preferred film is one that is basically clear and smooth on one side but has a suede textured surface on its other side to make it translucent rather than transparent. One advantage of this is that it provides a contrasting background for any printed material which might be impressed or adhered on the top surface of the disk. The translucent property also obscures the individual slides and slots which are otherwise evident on the top of the slide tray so that the appearance of the tray is more pleasing. Polycarbonate film having a thickness in the range of 0.008 to 0.012 of an inch is a satisfactory thickness for the polycarbonate film. A preferred thickness is about 0.010 of an inch. A polycarbonate resin cover disk having a thickness in the suggested range and, particularly, at about 0.010 of an inch thick results in a disk which is somewhat pliable and yet has sufficient rigidity to resist folding or cracking when it is handled.

Although a cover disk 40 composed of polycarbonate resin is preferred, other materials may be used. As implied above, bristol board or other paper product having a thickness that is balanced with its inherent stiffness to produce the handling properties mentioned above could also be used. Moreover, other synthetic resins such as polyethylene, polyurethane and polypropylene may be used.

Whatever material is used for the cover disk, it should withstand the heat of the cooling fan air from the projector without melting or deforming; it should be tough and not tear easily; it should resist cracking and it should preferably represent a compromise between stiffness and complete flexibility. A disk having the properties described above will be flexible enough to deflect a little bit so as to provide a gap between it and the top edges of the tray separator partitions so as to allow free discharge of the hot air which normally emerges from the slot of the projector through the slides are dropped into the magazine.

The true scope of the invention is expressed in the claims which follow.

I claim:

1. A dirt excluding cover for use with a slide tray that cooperates with a projector which has a cooling air propelling fan in it, the slide tray comprising a generally cylindrical body, a plurality of axially and radially extending circularly arranged spaced apart separator walls on the body defining slide receiving slots in the tray, a locking member having a cylindrical portion selectively engageable and disengageable with said body concentrically with said circular arranged partition walls, said locking member having a radially outwardly extending flange for overhanging radially inward portions of said partition walls to retain slides in the slots of said tray, said cover comprising:

a disk composed of non-metallic material having a radial dimension from its center to its outer circular edge substantially equal to the radial extent of said partition walls for said disk to overlay the slots in the tray, said disk having a central opening through which said cylindrical portion of said locking member passes to enable it to engage said tray and to dispose said flange of the locking member over a radially extending portion of said disk to thereby retain said disk superimposed over said slots, said disk material being selected from a class of materials consisting of paper and synthetic resin and the disk being sufficiently thin for it to fit loosely between said flange on the locking member and the separator walls and for it to flex slightly to increase the size of the hot air discharge path between said disk and said slots when said disk is locked by said locking member and said projector is operating.

2. The cover disk as in claim 1 including at least one perforation between the edge of its central opening and its outer edge for admitting an element projecting from said slide tray to prevent said disk from rotating on the tray.

3. The cover disk as in claim 1 characterized more specifically as having a thickness no less than about 0.008 of an inch and no greater than about 0.0625 of an inch.

4. The cover disk as in any of claims 1 or 2 wherein said disk material is polycarbonate resin having a thickness in the range of 0.008 to 0.012 of an inch.

5. The cover disk as in any of claims 1 or 2 where said disk material is polycarbonate resin about 0.010 of an inch thick.

6. The cover disk as in any of claims 1 or 2 wherein said disk is polycarbonate resin having a thickness in the range of 0.008 to 0.010 of an inch thick and said disk having one surface that is textured to make it translucent and an opposed surface that is smooth.

* * * * *